(12) United States Patent
Danna et al.

(10) Patent No.: US 11,639,118 B2
(45) Date of Patent: May 2, 2023

(54) SYSTEM FOR POSITIONING A COMPONENT ON THE FLOOR OF THE PASSENGER COMPARTMENT OF A VEHICLE

(71) Applicant: ITALDESIGN-GIUGIARO S.P.A., Turin (IT)

(72) Inventors: Fabio Danna, Monastero di Vasco (IT); Massimiliano Chidichimo, Nichelino (IT); Elena Flaminia Dirce Tammaro, Turin (IT); Diego Sabba, Moncalieri (IT); Daniele Gerbino, Calatafimi Segesta (IT); Antonio Matullo, Rivalta di Torino (IT); Roberto Bodrone, Castiglione Torinese (IT)

(73) Assignee: ITALDESIGN-GIUGIARO S.P.A., Turin (IT)

( * ) Notice: Subject to any disclaimer, the term of this patent is extended or adjusted under 35 U.S.C. 154(b) by 0 days.

(21) Appl. No.: 17/618,134

(22) PCT Filed: May 22, 2020

(86) PCT No.: PCT/IB2020/054871
§ 371 (c)(1),
(2) Date: Dec. 10, 2021

(87) PCT Pub. No.: WO2020/250061
PCT Pub. Date: Dec. 17, 2020

(65) Prior Publication Data
US 2022/0234476 A1 Jul. 28, 2022

(30) Foreign Application Priority Data
Jun. 11, 2019 (IT) .......................... 102019000008565

(51) Int. Cl.
*B60N 2/06* (2006.01)
*B60N 2/07* (2006.01)

(52) U.S. Cl.
CPC ........... *B60N 2/062* (2013.01); *B60N 2/0715* (2013.01)

(58) Field of Classification Search
CPC .............................. B60N 2/042; B60N 2/0715
See application file for complete search history.

(56) References Cited

U.S. PATENT DOCUMENTS

| | | | | |
|---|---|---|---|---|
| 10,323,741 B2 * | 6/2019 | Gassner | ................ | F16H 57/025 |
| 10,773,612 B2 * | 9/2020 | Dry | ........................ | B60N 2/062 |

(Continued)

FOREIGN PATENT DOCUMENTS

| | | |
|---|---|---|
| EP | 1902895 A1 | 3/2008 |
| EP | 2873552 A1 | 5/2015 |

OTHER PUBLICATIONS

International Search Report, issued in PCT/IB2020/054871, dated Aug. 27, 2020, Rijswijk, Netherlands.

*Primary Examiner* — Anita M King
(74) *Attorney, Agent, or Firm* — Valauskas Corder LLC (57) ABSTRACT

A passenger compartment has a flat floor, a movable component and a positioning system for positioning the movable component on the floor. The positioning system has a lower rail extending along a first direction attached to the floor, a carriage slidably engaging with the lower rail for sliding along the first direction, and an upper rail extending along a second direction not coinciding with the first direction and slidably engaging with the carriage for sliding along the second direction. An interface member is attached to the upper rail and provided with openings for being removably connected to the movable component and making the movable component integral with the upper rail in a movement along the first and second directions. The lower rail has (Continued)

continuous-track electrical contacts extending along the lower rail. The carriage has sliding electrical contacts arranged in contact with the continuous-track electrical contacts for transmitting electrical signals.

9 Claims, 9 Drawing Sheets

(56) References Cited

U.S. PATENT DOCUMENTS

| | | | |
|---|---|---|---|
| 10,857,913 B2* | 12/2020 | Dry | B60N 2/0276 |
| 2009/0108615 A1* | 4/2009 | Akiya | B60N 2/062 |
| | | | 297/344.11 |
| 2018/0009348 A1 | 1/2018 | Deshmukh | |
| 2021/0146804 A1* | 5/2021 | Tanabe | B60R 22/22 |

* cited by examiner

SYSTEM FOR POSITIONING A COMPONENT ON THE FLOOR OF THE PASSENGER COMPARTMENT OF A VEHICLE

CROSS-REFERENCE TO RELATED APPLICATIONS

This application is a U.S. National Phase filing of PCT International Patent Application No. PCT/IB2020/054871, having an international filing date of May 22, 2020, which claims priority to Italian Patent Application No. 102019000008565, filed Jun. 11, 2019 each of which is hereby incorporated by reference in its entirety.

The present invention generally relates to a vehicle compartment, and more particularly to a positioning system for positioning a component, such as for example a seat or a table, on the floor of the compartment.

BACKGROUND ART

A system for positioning a seat in the passenger compartment of a vehicle is known for example from US 2018/0009348 A1. According to this known solution, by means of a rail system arranged on the roof of the passenger compartment it is possible to move a plurality of seats between a plurality of positions inside the passenger compartment. However, this known system has several drawbacks. First of all, it does not allow the seat to be positioned in any position inside the vehicle compartment, but only in the positions defined by the path of the rails. In fact, it is not possible to move the seat along a direction that does not coincide with that along which the rails extend, for example diagonally. Furthermore, this known positioning system does not allow the seat to be released and removed. Finally, since this known positioning system is coupled to the roof of the passenger compartment, it is not applicable to any type of vehicle (for example, not to convertible vehicles).

EP 1 902 895 A1 discloses a system for moving the seat of a vehicle, where a plurality of rows of fixed lower rails are arranged on the floor of the vehicle, oriented parallel to an antero-posterior direction and spaced apart in the width direction of the vehicle. An upper rail is provided in the lower part of a seat and is movably hooked to the lower rails. A lowered area is formed in the vehicle floor which allows the transport of a carriage along lower rails in the width direction of the vehicle. The carriage has upper longitudinal guides acting as extensions for the lower rails, so as to be capable of directly slidably accepting the upper rail from a lower fixed rail. The seat may thus be moved laterally on the carriage to engage on a different lower rail.

SUMMARY OF THE INVENTION

It is an object of the present invention to provide a system for positioning a component on the floor of the passenger compartment of a vehicle which does not have the drawbacks of the prior art discussed above.

FIELD OF THE INVENTION

This and other objects are fully achieved according to the present invention by a positioning system as described and claimed herein. Advantageous embodiments of the invention are also described.

In summary, the invention is based on the idea of constructing the floor of the passenger compartment of the vehicle as a flat floor and of mounting on such a floor a positioning system comprising:
a first lower rail which extends along a first direction (for example along the longitudinal direction of the vehicle) and is attached to the floor of the passenger compartment;
a first carriage slidably engaged with the first lower rail for sliding along the first direction;
a first upper rail which extends along a second direction which does not coincide with the first direction (for example along the transverse direction of the vehicle) and slidably engages with the first carriage to slide along the second direction; and
an interface member which is attached to the first upper rail and is provided with connection means for detachably connecting to the first upper rail the component to be moved inside the vehicle compartment. The lower rail comprises continuous-track electrical contacts extending along the lower rail. The carriage comprises sliding electrical contacts arranged in contact with the continuous-track electrical contacts for transmitting power electrical signals and/or data.

By virtue of such a positioning system it is possible to position the component in any position on the floor of the passenger compartment of a vehicle. In particular, by virtue of the possibility of simultaneously and independently controlling the movement of the first carriage with respect to the first lower rail along the first direction and the movement of the first upper rail with respect to the first carriage along the second direction, it is possible move the component along any direction that does not coincide with the first nor with the second direction. Furthermore, the component may be disconnected from the interface member, for example to be removed or replaced.

Advantageously, the positioning system further comprises locking means adapted to block the first carriage with respect to the first lower rail and the first upper rail with respect to the first carriage to keep the component locked in a given position of use.

Preferably, the positioning system is provided with motor means, including for example electric motors, for controlling the sliding movements of the first carriage with respect to the first lower rail and of the first upper rail with respect to the first carriage.

The component that may be connected to the interface member of the positioning system to be positioned in the desired position on the floor of the passenger compartment of the vehicle may be for example a seat (for the vehicle's driver or for a passenger), a sofa, an armchair, a table (or more generally a support surface), a mini-bar, an infotainment system (such as an electronic device or a screen for the use of multimedia contents), a vehicle control or driving system, or a combination of the above and/or other components.

BRIEF DESCRIPTION OF THE DRAWINGS

Further features and advantages of the present invention will appear more clearly from the following detailed description, given by way of a non-limiting example, with reference to the accompanying drawings, in which.

DETAILED DESCRIPTION

Figure 1:
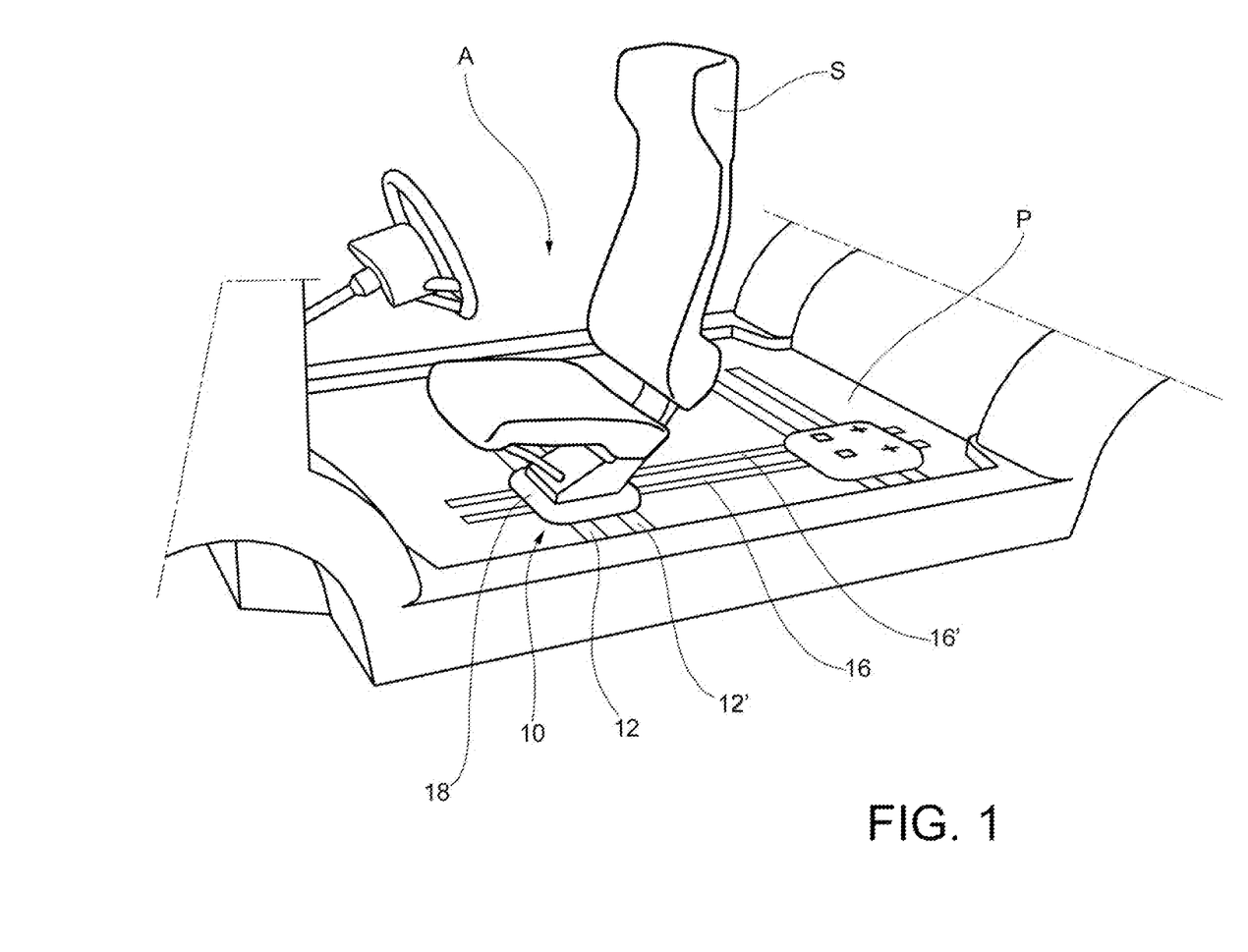
FIG. 1 is a perspective view of part of a vehicle compartment provided with a positioning system according to an embodiment of the invention, in which the positioning system is used for positioning seats on the floor of the passenger compartment.

With reference initially to FIG. 1, a passenger compartment of a vehicle, in particular of a motor vehicle, is generally indicated with A. The invention was conceived with particular reference to the application on self-driving vehicles, but it is of course applicable to any other vehicle.

The passenger compartment A includes a floor P, which according to the invention is made as a flat floor. On the floor P, and therefore inside the passenger compartment A, there is a positioning system 10 suitable for positioning a movable component S in the plane of the floor P. In the illustrated example, the movable component S is a seat and therefore for convenience it will be hereinafter referred to as a seat, but it is clear that the positioning system 10 may be used for positioning any other movable component on the floor P of the passenger compartment A, such as for example a table, a control console, a mini-bar, etc.

The positioning system 10 basically comprises at least one lower rail 12, at least one carriage 14, at least one upper rail 16 and at least one interface member 18, wherein the lower rail 12 is attached to the floor P, the carriage 14 is slidably attached to the lower rail along a first direction x, the upper rail 16 is slidably attached to the carriage 14 along a second direction y which does not coincide with the first direction x, in particular perpendicular to the first direction x, and the interface member 18 is attached to the upper rail 16 so as to move integrally with it. Preferably, the first direction x and the second direction y coincide with the longitudinal direction and with the transverse direction of the vehicle, respectively.

As may be observed in FIGS. 1 to 4, the positioning system 10 may also comprise a plurality of lower rails and/or upper rails and/or carriages and/or interface members according to the specific application.

Figure 2:
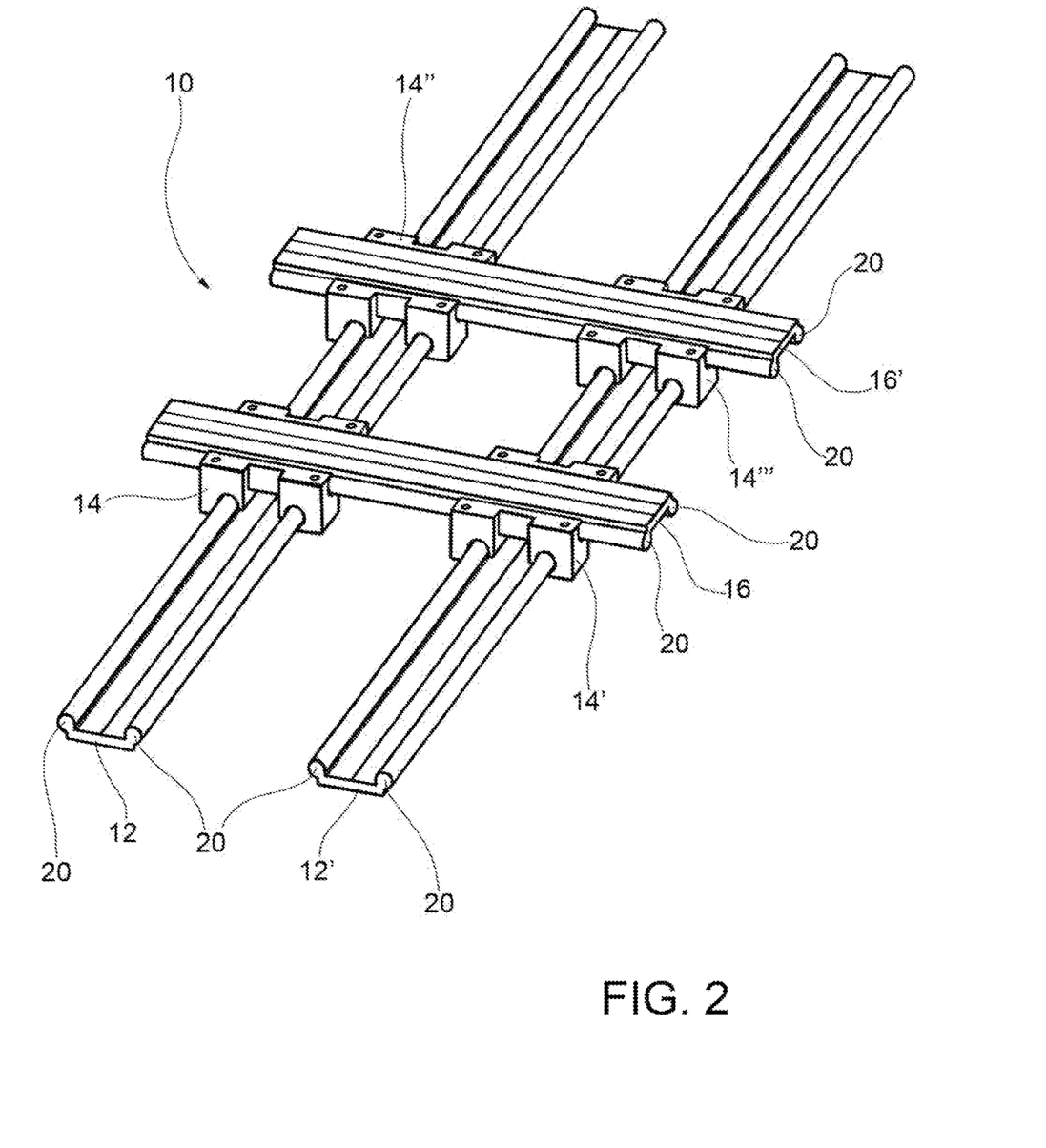
FIG. 2 is a perspective view of a part of the positioning system of FIG. 1.

For example, in the embodiment of FIGS. 1 and 2, the positioning system 10 comprises a pair of lower rails, namely a first lower rail 12 and a second lower rail 12', four carriages, and precisely a first carriage 14, a second carriage 14', a third carriage 14" and a fourth carriage 14''', a pair of upper rails, namely a first upper rail 16 and a second upper rail 16', as well as a single interface member 18 fixed both to the first upper rail 16 and to the second upper rail 16'.

The first lower rail 12 and the second lower rail 12' extend parallel to each other along the first direction x. The first lower rail 12 and the second lower rail 12' are preferably identical to each other. In particular, the first lower rail 12 and the second lower rail 12' may each comprise a pair of elongated guide members 20, having a substantially circular section, which extend along the entire length of the respective lower rail 12 and 12'.

Likewise, the first upper rail 16 and the second upper rail 16' extend parallel to each other along the second direction y. The first upper rail 16 and the second upper rail 16' are preferably identical to each other, as well as identical to the first lower rail 12 and the second lower rail 12', as in the embodiments shown in the figures.

The first carriage 14 and the third carriage 14" slidably engage with the first lower rail 12 for sliding along the first direction. Likewise, the second carriage 14' and the fourth carriage 14''' slidably engage with the second lower rail 12' to also slide along the first direction x. The first upper rail 16 slidably engages with the first carriage 14 and with the second carriage 14' for sliding along the second direction y. Likewise, the second upper rail 16' slidably engages with the third carriage 14" and with the fourth carriage 14''' for also sliding along the second direction y.

The first, second, third and fourth carriage 14, 14', 14" and 14''' are preferably identical to each other, so what will now be explained in relation to the first carriage 14 is to be considered likewise applicable also in relation to the second carriage 14', to the third carriage 14" and to the fourth carriage 14'''.

Figure 5:
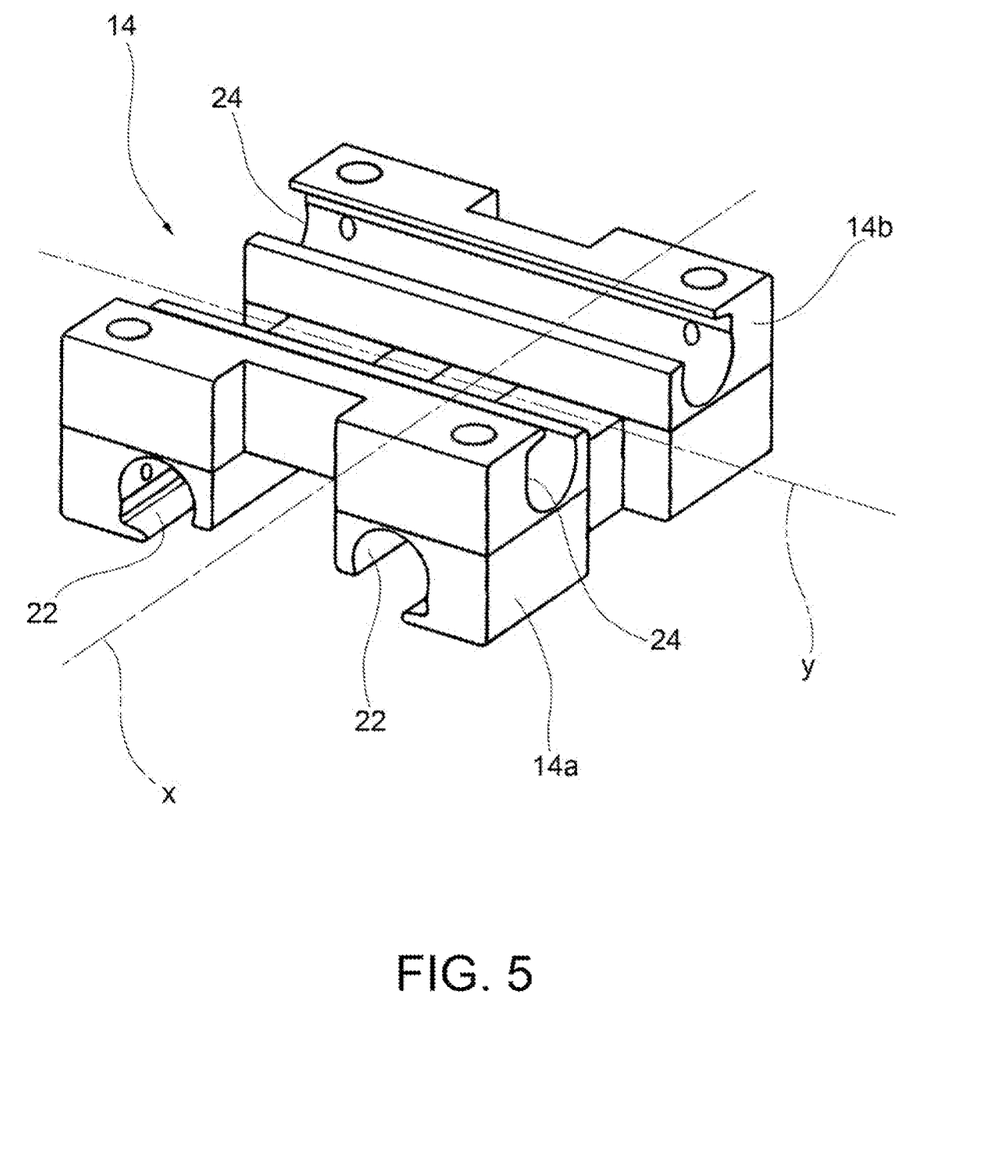
FIG. 5 is a perspective view of a carriage of the positioning system according to the invention.

With reference to FIG. 5, the first carriage 14 has a pair of lower seats 22 which extend parallel to each other along the first direction x and have a section of a shape complementary to that of the elongated guide members 20 of the first lower rail 12, to allow a sliding engagement of the first carriage 14 with the first lower rail 12. Likewise, the first carriage 14 has a pair of upper seats 24 which extend parallel to each other along the second direction y and have a section of a shape complementary to that of the elongated guide members 20 of the first upper rail 16, to allow a sliding engagement of the first carriage 14 with the first upper rail 16. To facilitate the sliding of the moving parts, the seats 22 and 24 are advantageously coated with a TEFLON coating.

The first carriage 14, as in the embodiment of FIG. 5, may be made in two parts, namely a lower part 14a and an upper part 14b, rigidly connected to each other, for example by means of screws or other mechanical connection. The lower seats 22 are provided in the lower part 14a, while the upper seats 24 are provided in the upper part 14b. Preferably, the lower part 14a and the upper part 14b are identical to each other and are connected rotated relative to each other by an angle equal to the angle between the first direction x and the second direction y. Alternatively, the first carriage 14 may be made in a single piece.

Figure 3:
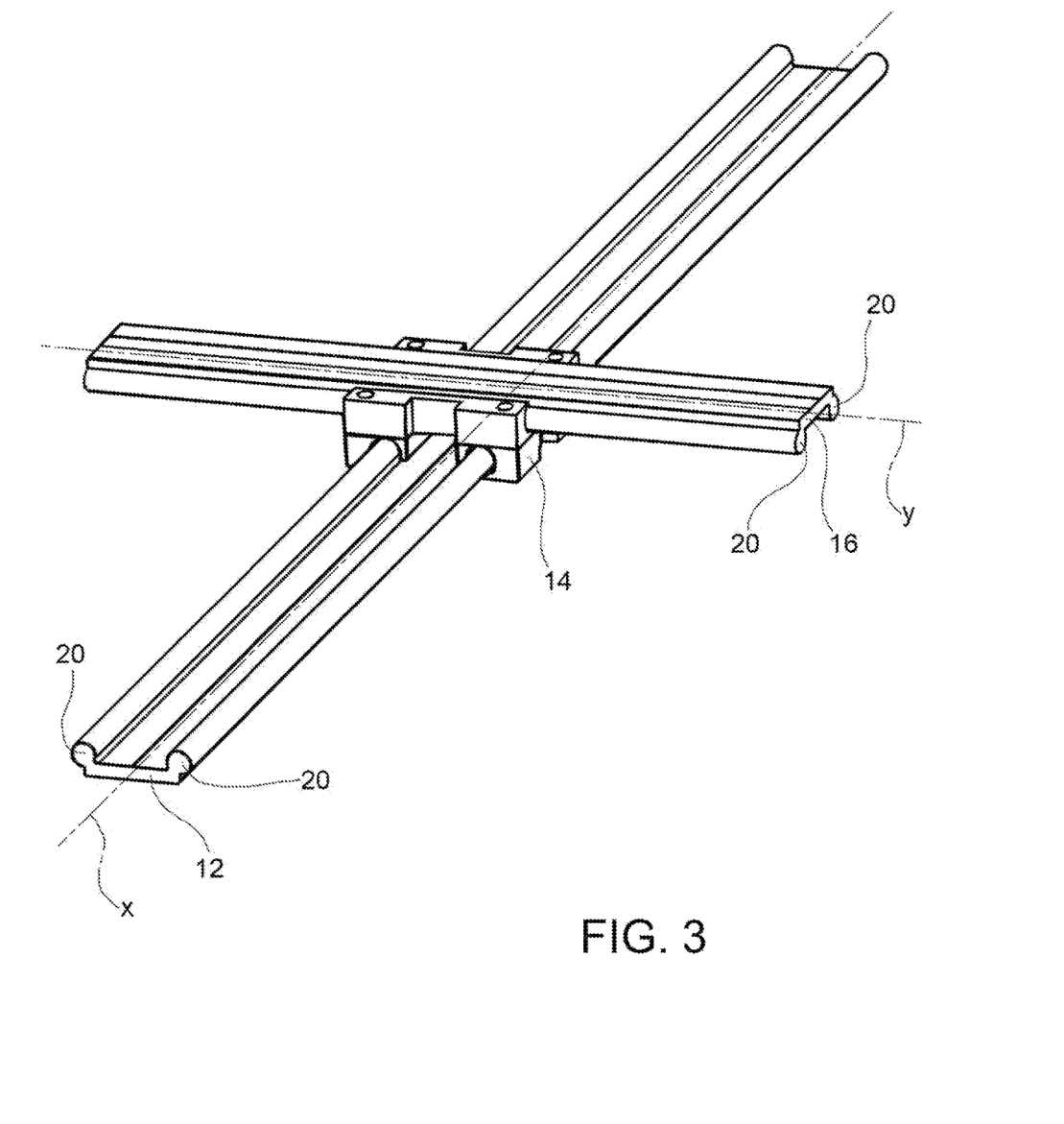
FIG. 3 is a perspective view of a part of a positioning system according to a further embodiment of the invention.

In an alternative embodiment, shown in FIG. 3, the positioning system 10 comprises a single first lower rail 12, a single carriage 14 and a single first upper rail 16, which are made as described above with reference to FIGS. 1, 2 and 5. The interface member (not shown in FIG. 5) is attached to the only first upper rail 16.

Figure 4:
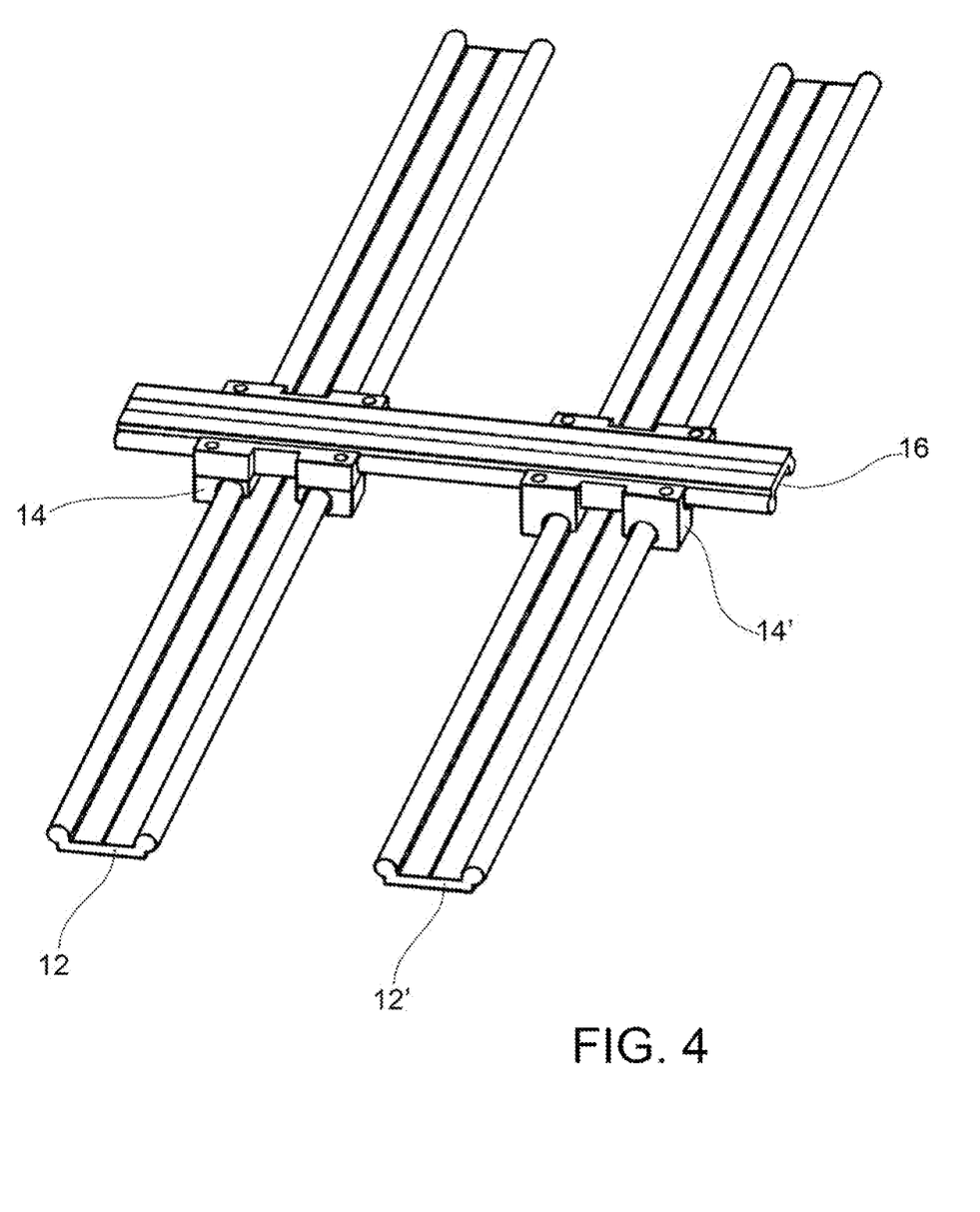
FIG. 4 is a perspective view of a part of a positioning system according to yet a further embodiment of the invention.

According to a further alternative embodiment, shown in FIG. 4, the positioning system 10 comprises a first and a second lower rail 12 and 12', a first carriage 14 attached to the first lower rail 12, a second trolley 14' attached to the second lower rail 12' and a single first upper rail 16 which slidably engages with both the first carriage 14 and the second carriage 14'.

Also in this embodiment, the interface member 18 is attached to the only first upper rail 16.

It is clear that the number of carriages, lower rails and upper rails is not a limiting feature of the invention and may therefore be varied according to the specific application.

Figure 6:
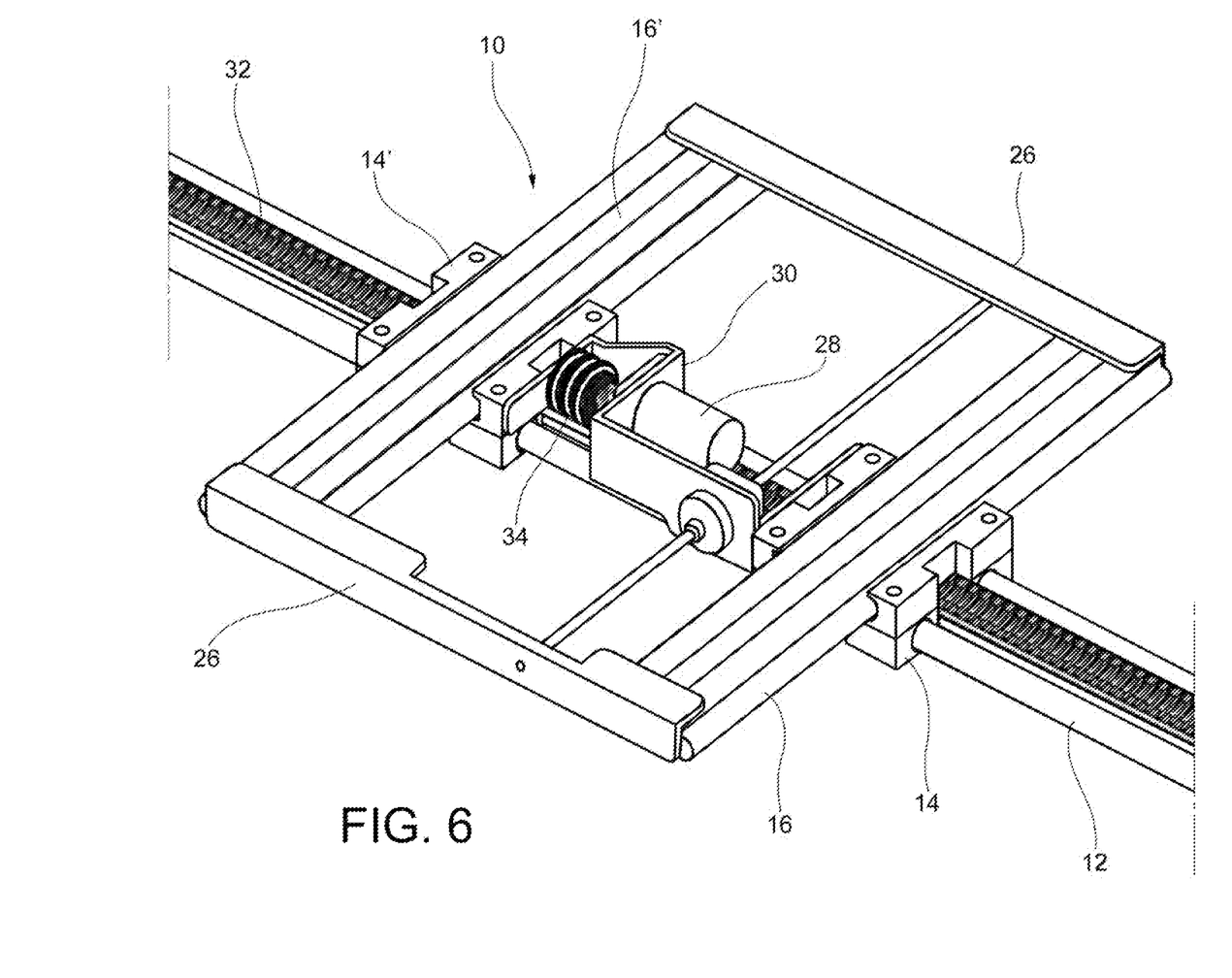
FIG. 6 is a perspective view of a part of a positioning system according to a further embodiment of the invention.

FIG. 6 shows a positioning system 10 according to a further alternative embodiment, comprising a single lower rail 12, a first carriage 14 and a second carriage 14' which are both attached to the lower rail 12 and are rigidly connected to each other, a first upper rail 16 which slidably engages with the first carriage 14 and a second upper rail 16' which slidably engages with the second carriage 14'. The first and second upper rails 16 and 16' are preferably connected to each other, for example by means of a pair of profiled elements 26, so as to move integrally with each other not only along the first direction x, but also along the second direction y.

According to this further embodiment (but the same is also applicable to other embodiments that differ from the present in the number and arrangement of the rails and carriages), the movement of at least one of the movable parts of the positioning system (in the present case, the movement of the carriages 14 and 14' along the lower rail 12) is electrically controlled. For this purpose, the positioning system 10 comprises a first electric motor 28, mounted on a support structure 30 attached to the first and second carriages 14 and 14', and a first motion conversion mechanism for converting a rotary motion generated by the first electric motor 28 into linear motion of the first and second carriages 14 and 14' along the lower rail 12. A second electric movement system (not shown here) similar to the first, with a second electric motor and a second motion conversion mechanism for converting the rotary motion generated by the second electric motor into a linear motion of the first upper rail 16 with respect to the first carriage 14, as well as the second upper rail 16' with respect to the second carriage 14', may be provided for controlling the sliding movement of the upper rails 16 and 16' along the second direction y.

Figure 7:
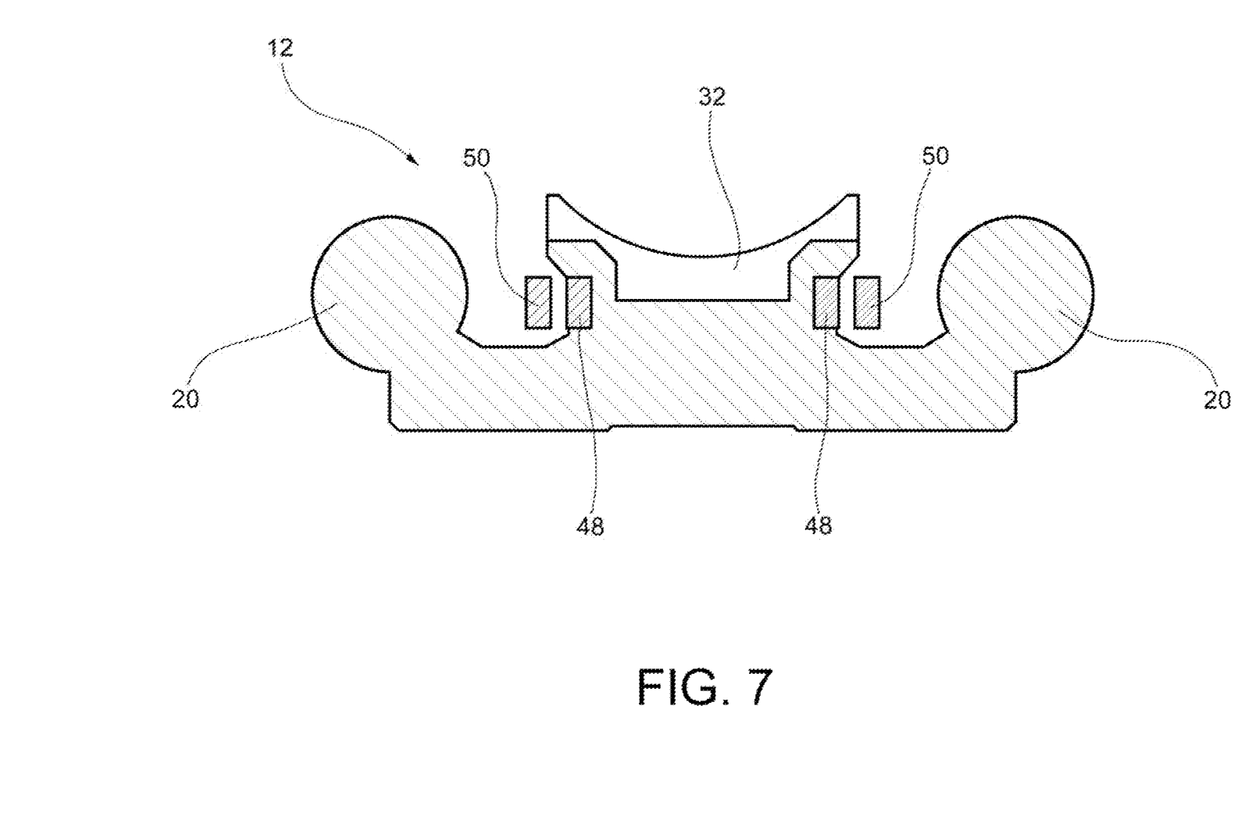
FIG. 7 is a sectional view of a rail of the positioning system of FIG. 6.

According to the exemplary embodiment of FIGS. 6 and 7, the first motion conversion mechanism (but the same applies to the possible second motion conversion mechanism) is made as a rack and worm screw system. In this case, the first motion conversion mechanism comprises a rack 32 attached to the lower rail 12 and a worm screw 34 which is driven in rotation by the first electric motor 28 and meshes with the rack 32.

Advantageously, the positioning system 10 further comprises one or more locking mechanisms (not shown, but in any case of a type known per se) adapted to lock the relative movement of one or more movable parts of the positioning system. For example, a first locking mechanism adapted to lock the relative position of the first carriage 14 with respect to the first lower rail 12 and a second locking mechanism adapted to lock the relative position of the first upper rail 16 with respect to the first carriage 14 may be provided.

As mentioned above, the interface member 18 is mounted on the first upper rail 16 (or better, on the first and second upper rails 16 and 16', in the case of two upper rails). More specifically, the interface member 18 is rigidly connected to the first upper rail 16 (and to the second upper rail 16', where present) so as to move together with it both along the first direction x and along the second direction y to be positioned in any position on the floor plane P.

Figure 8:
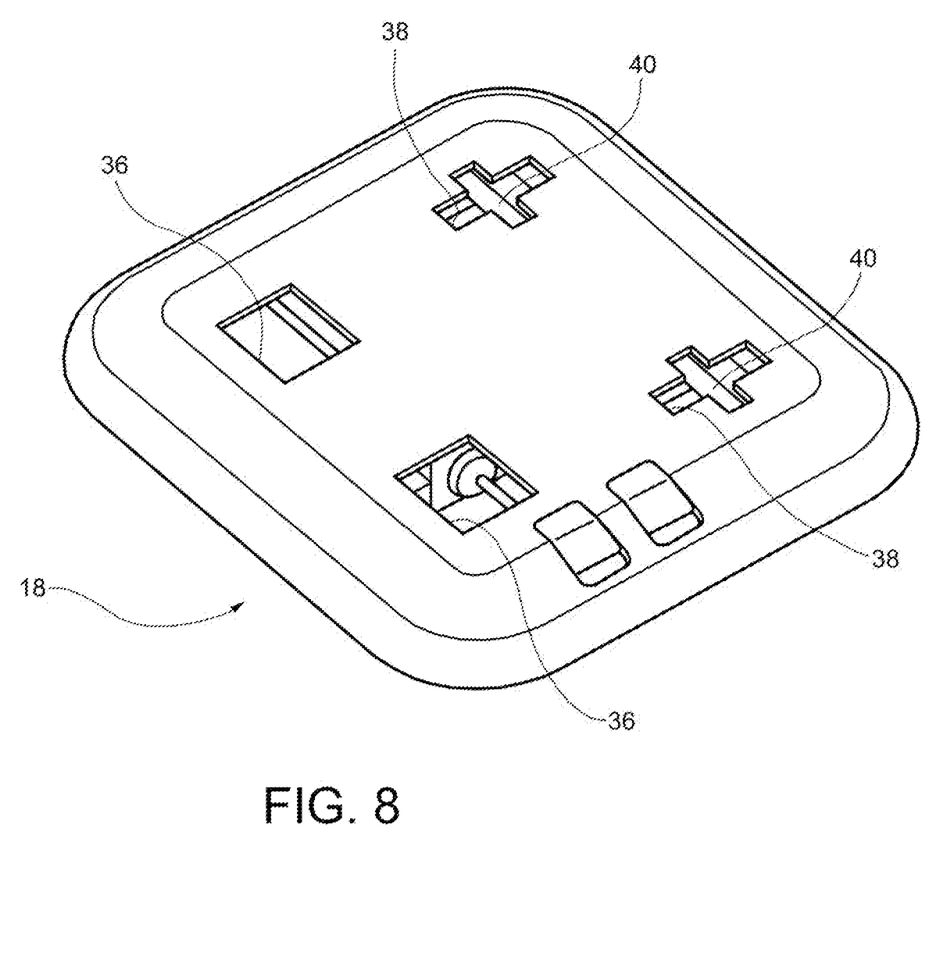
FIG. 8 is a perspective view of an interface member of the positioning system of FIG. 1.

With reference to FIG. 8, the interface member 18 is a plate element, on which connection means are provided for the removable connection of the movable component S to the interface member 18. Said connection means may comprise a plurality of openings for the insertion of suitable coupling elements provided on the movable component.

Figure 9A:
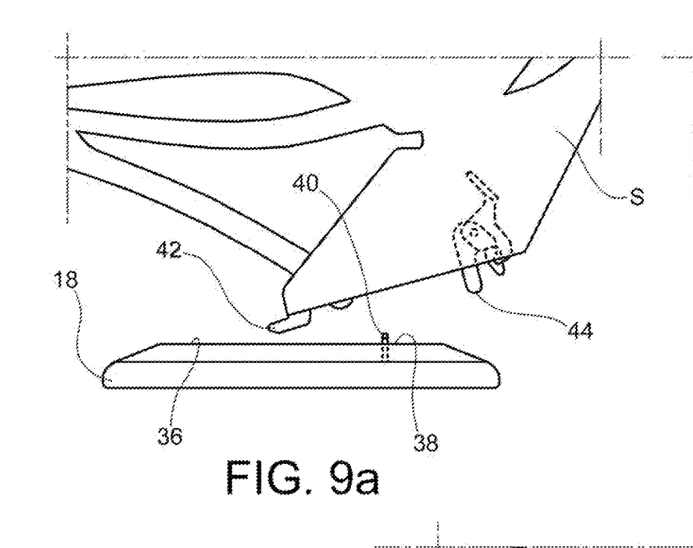
FIGS. 9a, 9b and 9c are side views which show in sequence the procedure for attaching a component, in particular a seat, to the interface member of FIG. 8.
Figure 9B:
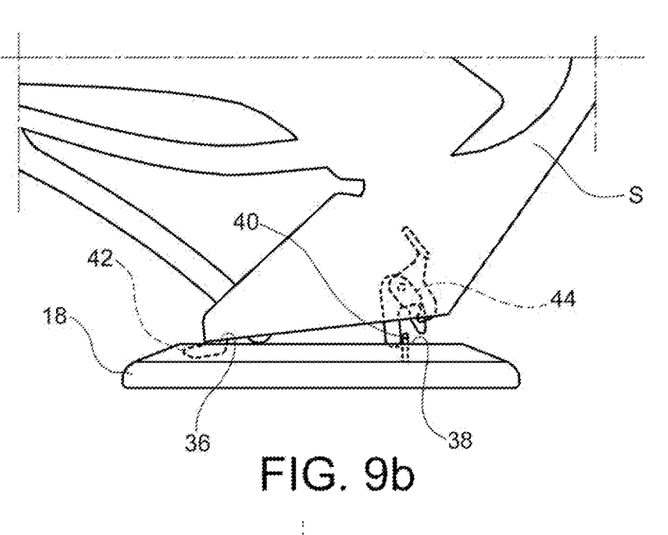
Figure 9C:
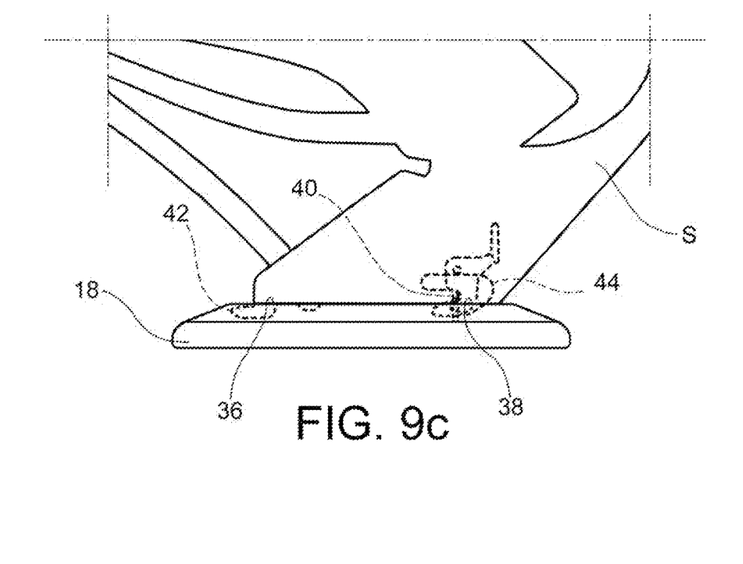

For example, in the embodiment of FIG. 8, the interface element 18 has a pair of front openings 36 and a pair of rear openings 38. Furthermore, in each of the rear openings 38 a respective U-shaped bracket 40 is advantageously positioned. In this case, as shown in FIGS. 9a to 9c, the movable component S is provided with a pair of front coupling elements 42, suitable for engaging each in a respective front opening 36 of the interface member 18, and a pair of rear coupling members 44, which are switchable between a coupling position (FIG. 9c), in which they each engage with a respective U-shaped bracket 40 to ensure a secure coupling of the movable component S to the interface member 18, and a release position (FIGS. 9a and 9b), in which they each disengage from the respective U-shaped bracket 40 to allow removal of the movable component S from the interface member 18. In this regard, FIGS. 9a-9c show of the movable component S to interface member 18.

Clearly, the number, type and arrangement of the openings and/or coupling elements arranged for the removable connection of the movable component S to the interface member 18 may be varied with respect to what is described above.

The positioning system 10 further comprises a plurality of electrical contacts, which may be used for powering the electric motors (where provided) which control the movement of the movable parts of the positioning system, for powering the movable component S (where necessary) and/or for the transmission of data to/from the aforementioned components.

In particular, according to an embodiment, as shown in FIG. 7, the first lower rail 12 comprises first continuous-track electrical contacts 48 extending along the entire length of such a rail, and the first carriage 14 comprises first sliding electrical contacts 50 arranged in contact with the first electrical contacts 48 of the rail 12 and may serve for transmitting both an electrical power signal (for example for the power supply of the first electric motor 28) and a data signal. In particular, it is possible to use the electrical contacts 48 and 50 for data transmission via the so-called PLC ("Power Line Communication"), or "conveyed wave" technology, which allows the use of an electrical power supply network as a means of data transmission, superimposing a higher frequency signal for data transmission on the low power transmission frequency signal, and using an electronic filter system for the separation of the two signals. The electrical contacts 48 and 50 may also be configured for possible integration with the signal transmission on optical fiber, both for the transmission of a power signal and for the transmission of a data signal, using what is known from row and multi-row rotating brush collectors.

What has just been described may similarly be applied to the carriage(s) and to the upper rail(s) for the transmission of electric power and/or the transmission of data between these components.

As may be seen from the above description, a positioning system of a vehicle according to the present invention allows the drawbacks of the prior art to be overcome. In particular, by virtue of the overlapping arrangement of two rows of rails, it allows the positioning of a movable component anywhere on the floor of the passenger compartment. Furthermore, by the use of an interface member provided with connection means for the removable connection with the movable component, the positioning system according to the invention allows the movable component to be replaced or removed, either for maintenance or cleaning purposes and for modifying the usability of the passenger compartment.

The manufacturing details and the embodiments may vary compared to what has been described and illustrated by way of a non-limiting example only, without departing from the scope of the invention as defined in the accompanying claims.

The invention claimed is:

1. A passenger compartment for a vehicle, in particular a motor vehicle, comprising a flat floor, a movable component and a positioning system for positioning the movable component on the flat floor, wherein the positioning system comprises:
    at least one lower rail which extends in a first direction (x) and is attached to the flat floor;
    at least one carriage which slidably engages with said at least one lower rail to slide in said first direction (x);
    at least one upper rail which extends in a second direction (y) not coinciding with said first direction (x) and slidably engages with said at least one carriage to slide in said second direction (y); and
    an interface member which is attached to said at least one upper rail and is provided with connection means for a releasable connection with the movable component to make the movable component drivingly connected to said at least one upper rail for movement in said first direction (x) and in said second direction (y) relative to the flat floor;
    wherein said at least one lower rail comprises first continuous-track electrical contacts extending along said at least one lower rail and wherein said at least one carriage comprises first sliding electrical contacts arranged in contact with said first continuous-track electrical contacts for transmitting power electrical signals and/or data.

2. The passenger compartment of claim 1, wherein the positioning system further comprises a first locking mechanism for locking said at least one carriage in a given position relative to said at least one lower rail and/or a second locking mechanism for locking said at least one upper rail in a given position relative to said at least one carriage.

3. The passenger compartment of claim 1, wherein the positioning system further comprises first motor means for controlling a sliding movement of said at least one carriage relative to said at least one lower rail along said first direction (x) and/or second motor means for controlling the sliding movement of said at least one upper rail relative to said at least one carriage along said second direction (y).

4. The passenger compartment of claim 3, wherein said first and/or second-motor means comprise an electric motor and a motion conversion mechanism for converting a rotary motion generated by a respective electric motor into a relative sliding movement of said at least one carriage with respect to said at least one lower rail and/or into a relative sliding movement of said at least one upper rail with respect to said at least one carriage.

5. The passenger compartment of claim 4, wherein each motion conversion mechanism comprises a rack attached to said at least one lower rail or said at least one upper rail and a toothed member, in particular a worm screw, that meshes with the rack and is arranged to be driven into rotation by the electric motor.

6. The passenger compartment of claim 1, wherein each of said at least one upper and lower rails comprises a pair of elongated guide members, which extend parallel to each other over an entire length of at least one of the upper and lower rails, and wherein said at least one carriage comprises a pair of lower seats, in which the pair of elongated guide members of said at least one lower rail slidably engage, and a pair of upper seats, in which the pair of elongated guide members of said at least one upper rail slidably engage.

7. The passenger compartment of claim 6, wherein said at least one carriage comprises a lower part having comprising said pair of lower seats and an upper part comprising said pair of upper seats, said lower part and upper part being made as separate parts, identical to each other, rigidly connected to each other and rotated relative to each other by an angle equal to the angle between said first and second directions (x, y).

8. The passenger compartment of claim 1, wherein said at least one upper rail comprises second continuous-track electrical contacts extending along said at least one upper rail and wherein said at least one carriage comprises second sliding electrical contacts arranged in contact with said second continuous-track electrical contacts for transmitting power electrical signals and/or data.

9. The passenger compartment of claim 1, wherein the movable component is provided with mechanical coupling means, and wherein said connection means comprise openings or brackets for engagement with said mechanical coupling means of the movable component.

* * * * *